(12) United States Patent
Guthrie et al.

(10) Patent No.: US 10,642,760 B2
(45) Date of Patent: May 5, 2020

(54) TECHNIQUES FOR COMMAND ARBITATION IN SYMMETRIC MULTIPROCESSOR SYSTEMS

(71) Applicant: INTERNATIONAL BUSINESS MACHINES CORPORATION, Armonk, NY (US)

(72) Inventors: Guy L. Guthrie, Austin, TX (US); Charles Marino, Round Rock, TX (US); Praveen S. Reddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 15/667,270

(22) Filed: Aug. 2, 2017

(65) Prior Publication Data

US 2019/0042486 A1 Feb. 7, 2019

(51) Int. Cl.
| | |
|---|---|
| *G06F 12/08* | (2016.01) |
| *G06F 13/16* | (2006.01) |
| *G06F 12/0813* | (2016.01) |
| *G06F 12/0811* | (2016.01) |
| *G06F 12/0831* | (2016.01) |

(52) U.S. Cl.
CPC ........ *G06F 13/161* (2013.01); *G06F 12/0811* (2013.01); *G06F 12/0813* (2013.01); *G06F 12/0831* (2013.01); *G06F 2212/621* (2013.01)

(58) Field of Classification Search
CPC .............. G06F 13/161; G06F 12/0811; G06F 12/0813; G06F 12/0831; G06F 2212/621
See application file for complete search history.

(56) References Cited

U.S. PATENT DOCUMENTS

| | | | |
|---|---|---|---|
| 6,356,942 B1 * | 3/2002 | Bengtsson | G06F 9/4403 709/219 |
| 7,254,694 B2 | 8/2007 | Clark et al. | |
| 7,380,102 B2 | 5/2008 | Chung et al. | |
| 7,409,481 B2 | 8/2008 | Clark et al. | |
| 7,415,030 B2 | 8/2008 | Goodman et al. | |
| 7,451,231 B2 | 11/2008 | Goodman et al. | |
| 7,483,422 B2 | 1/2009 | Fields, Jr. et al. | |
| 7,627,738 B2 | 12/2009 | Chung et al. | |
| 7,818,388 B2 | 10/2010 | Arimilli et al. | |
| 7,944,932 B2 | 5/2011 | Clark et al. | |
| 8,103,791 B2 | 1/2012 | Goodman et al. | |
| 8,205,024 B2 | 6/2012 | Clark et al. | |
| 8,254,411 B2 | 8/2012 | Clark et al. | |
| 8,407,443 B1 | 3/2013 | Nordquist | |

(Continued)

OTHER PUBLICATIONS

Parcerisa et al. "On-Chip Interconnects and Instruction Steering Schemes for Clustered Microarchitectures," IEEE pp. 1-32, Jan. 3, 2005.

*Primary Examiner* — Reginald G Bragdon
*Assistant Examiner* — Edward Wang
(74) *Attorney, Agent, or Firm* — Michael R. Long; Nathan Rau

(57) ABSTRACT

A technique for operating a data processing system includes determining, by an arbiter of a processing unit of the data processing system, whether an over-commit has occurred. In response to determining that the over-commit has occurred, the arbiter selects a broadcast command to be dropped based on a number of hops traversed through the data processing system by the broadcast command.

6 Claims, 12 Drawing Sheets

(56) References Cited

U.S. PATENT DOCUMENTS

| | | |
|---|---|---|
| 9,367,504 B2 | 6/2016 | Guthrie et al. |
| 9,367,505 B2 | 6/2016 | Guthrie et al. |
| 2008/0085702 A1* | 4/2008 | Park ..................... H04W 40/28 455/422.1 |
| 2013/0336199 A1* | 12/2013 | Schwartz ........... H04B 7/15507 370/315 |
| 2014/0156929 A1 | 6/2014 | Falsafi et al. |
| 2015/0178233 A1* | 6/2015 | Guthrie ................ G06F 13/362 710/114 |
| 2015/0188829 A1 | 7/2015 | Satpathy et al. |

* cited by examiner

TECHNIQUES FOR COMMAND ARBITRATION IN SYMMETRIC MULTIPROCESSOR SYSTEMS

BACKGROUND

The present disclosure relates in general to data processing systems and, in particular, to techniques for command arbitration in symmetric multiprocessor systems.

Traditionally, symmetric multiprocessor (SMP) systems, such as a server computer systems, have included multiple processing units all coupled to a system interconnect, which has included one or more address, data, and control buses. Coupled to the system interconnect was a system memory, which represented the lowest level of volatile memory in the multiprocessor computer system and which was generally accessible for read and write access by all processing units. In order to reduce access latency to instructions and data residing in the system memory, each processing unit was typically further supported by a respective multi-level cache hierarchy, the lower level(s) of which may be shared by one or more processor cores.

BRIEF SUMMARY

A technique for operating a data processing system includes determining, by an arbiter of a processing unit of the data processing system, whether an over-commit has occurred. In response to determining that the over-commit has occurred, the arbiter selects a broadcast command to be dropped based on a number of hops traversed through the data processing system by the broadcast command.

DETAILED DESCRIPTION

Figure 1:
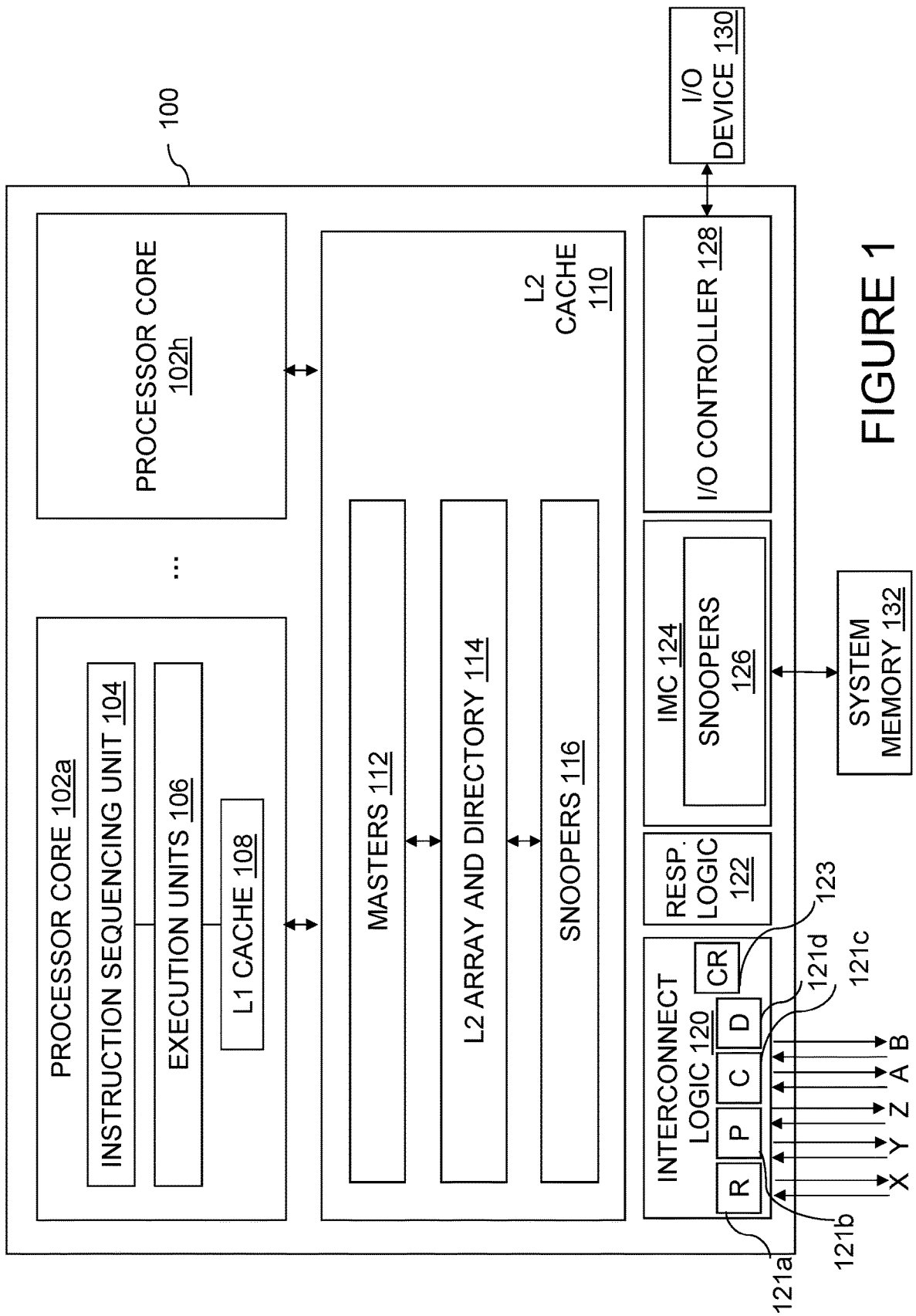
FIG. 1 is a high level block diagram of an exemplary processing unit according to one embodiment of the present disclosure.

Today, POWER® processors may be configured to implement a multi-level (e.g., three-level) hierarchy with respect to a broadcast scope of commands and the creation of data holders that may provide data to requesters. In relatively large 3-hop N-way symmetric multiprocessor (SMP) systems there may be thousands of in-flight transactions. These transactions are arbitrated and issued on a common command bus within a chip. The present disclosure describes techniques to implement command broadcast fairness within a chip of a multi-tiered SMP system that tend to favor multi-hop commands and reduce command retry rates for the multi-hop commands.

Based on studies of data traffic in previous POWER processors and with additional scopes and extensions to over-commit features in state-of-the-art POWER processors it has become increasingly desirable to provide commands that have traversed multiple 'hops' an increased chance to succeed. As used herein, the term 'hop' applies to a chip-to-chip transfer. In a proposed multi-tiered SMP system there can be up to three hops (e.g., local master (LM)→local hub (LH)→remote hub (RH)→remote leaf (RL)). As more hops are taken, the possibility of an over-commit drop of a broadcast command increases, which when an over-commit drop occurs results in a retry that requires a processing unit to rebroadcast the command using valuable resources and consuming additional power.

In traditional TDM arbitration schemes, for fairness, each chip has been assigned a 'slice-of-time' (slot) to broadcast commands and an unused slot was left 'on-the-table' in favor of being fair. In Power8 processors an over-commit feature was implemented that allowed a chip to drive more traffic than was allowed using traditional TDM arbitration schemes in order to maximize throughput and take advantage of unused slots from other chips. In the case of contention, commands were dropped and a processing unit would then retry the dropped commands at a slower pace. In general, fixed priority arbitration does not scale well in a three hop system in which groups (e.g., nodes of multiple processing units (chips)) are employed. According to one or more aspects of the present disclosure, a relative position between an incoming command to a local arbiter is taken into account when considering whether to drop a command in order to improve a command success rate for multi-hop commands. According to one or more embodiments, a weighting factor is implemented that accounts for the number of hops that a command has traversed. In one or more embodiments, fairness is achieved by considering the number of processing units being arbitrated.

A broadcast command originates from within a processing unit, which selects a required broadcast scope for the command to target a particular chip, a particular group of chips, or a system. In general, a command may be issued at a system scope or a scope that is some subset of the system. As used herein, a 'system' is considered to be a collection of processing units and memory whose memory address range is shared (flat address space) and is defined as a collection of one or more 'groups'. Each 'group' may include one or more 'chips'. A 'chip' is a collection of one or more 'units'. A 'unit' is a collection of one or more 'agents' that interact with a communication bus (e.g., the PowerBus) through control and data interfaces.

A command scope may specify a group (Vg) which is directed to all chips in a targeted group or a system. As used herein, a near node scope (NNS) refers to a broadcast scope that is constrained to the boundaries of the chip in which the master issuing the command is located (master) and the boundaries of the chip that are specified as the home chip of the address specified by the command (target). In the NNS, the target is located within the same group as the master. Commands issued with NNS are reported as having either a local command source in the master or a near command source in the target to snoopers receiving the command. A remote node scope (RNS) is a subset of system scope and refers to the broadcast scope that is constrained to the boundaries of the chip in which the master issuing the command is located (master) and the boundaries of the chip that are specified as the home chip of the address specified by the command (the target). In the RNS, the target is not located within the same group as the master. Commands issued with RNS scope are reported as having a local command source in the master and a remote command source in the target to snoopers receiving the command.

Depending on the topology of the implementation, chips in another group may see a command when the topology implementation requires the command to travel to intermediate chips to arrive at the target chip. It should be appreciated that RNS scope topology is not point-to-point. In a 2-hop topology one additional chip may be in the path between the master chip and the target chip. In a 3-hop topology two additional chips may be in the path between the master chip and the target chip. Inside a chip, a command arbiter sees transactions from the local chip, from one chip away (Group, NNS, RNS, System), two hops away (RNS, System), and three hops away (RNS, System). For simplicity, two and three hop commands can be combined and arbitrated together as multi-hop commands. On any incoming link, the tag of the command (which contains a chip identifier (ID) and a group ID) is decoded and sent to the arbiter. The arbiter assigns more weight to multi-hop transactions than single hop transactions. In general, each additional weight may indicate that an extra arbitration slot may be used for a command. In one or more embodiments, a local chip command and a one hop command are arbitrated together. As groups are added or deleted dynamically with a system that is running, weights can be adjusted accordingly. In one or more embodiments, a 'hot-plug' configuration register may be implemented to track all available groups (nodes) in a system and can be used to decrease or increase weights to provide fairness to 1-hop chips.

Arbitration issues may also arise within a chip where a location of units (e.g., processor cores) relative to the arbiter can favor one unit over other units. This phenomenon may be exaggerated in multi-level arbiters where the winner of several units is forwarded to the next level. A similar weighting system may be employed where units on one side are compared to units on another side. Units (e.g., processor cores) may be dynamically turned off and the weights may be modified on the fly to maintain fairness. As one example, a tracking structure can be created to determine if one side (which may contain multiple units) is from the same source. If from a repeat unit, associated weights may be reset to zero and arbitrated fairly across all units in the local chip. To address excessive drops on multi-hop system pumps, arbitration may be flat at each hop.

With reference now to the figures and, in particular, with reference to FIG. 1, there is illustrated a high level block diagram of an exemplary embodiment of a processing unit 100 in accordance with the present invention. In the depicted embodiment, processing unit 100 is a single integrated circuit (chip) including multiple (e.g., eight) processor cores 102a-102h for independently processing instructions and data. Each processor core 102 includes at least an instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and instructions that request read and write access to a memory block.

The operation of each processor core 102 is supported by a multi-level volatile memory hierarchy having at its lowest level one or more shared system memories 132 (only one of which is shown in FIG. 1) and, at its upper levels, one or more levels of cache memory. As depicted, processing unit 100 includes an integrated memory controller (IMC) 124 that controls read and write access to a system memory 132 in response to requests received from processor cores 102 and operations snooped on an interconnect fabric (described below) by snoopers 126.

In the illustrative embodiment, the cache memory hierarchy of processing unit 100 includes a store-through level one (L1) cache 108 within each processor core 102 and a level two (L2) cache 110 shared by all processor cores 102 of the processing unit 100. L2 cache 110 includes an L2 array and directory 114, masters 112, and snoopers 116. Masters 112 initiate transactions on the interconnect fabric and access L2 array and directory 114 in response to memory access (and other) requests received from the associated processor cores 102. Snoopers 116 detect operations on the interconnect fabric, provide appropriate responses, and perform any accesses to L2 array and directory 114 required by the operations. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

As further shown in FIG. 1, processing unit 100 includes integrated interconnect logic 120 by which processing unit 100 may be coupled to the interconnect fabric as part of a larger data processing system. In the depicted embodiment, interconnect logic 120 supports an arbitrary number t1 of "first tier" interconnect links, which in this case include in-bound and out-bound X, Y, and Z links. Interconnect logic 120 further supports an arbitrary number t2 of second tier links, designated in FIG. 1 as in-bound and out-bound A and B links. With these first and second tier links, each processing unit 100 may be coupled for bi-directional communication to up to t1/2+t2/2 (in this case, five) other processing units 100. Interconnect logic 120 includes request logic 121a, partial response logic 121b, combined response logic 121c, and data logic 121d for processing and forwarding information during different phases of operations. In addition, interconnect logic 120 includes a configuration register 123 including a plurality of mode bits utilized to configure processing unit 100. As further described below, these mode bits preferably include: (1) a first set of one or more mode bits that selects a desired link information allocation for the first and second tier links; (2) a second set of one or more mode bits that specify which of the first and second tier links of the processing unit 100 are connected to other processing units 100; (3) a third set of one or more mode bits that determines a programmable duration of a protection window extension; (4) a fourth set of one or more mode bits that predictively selects a scope of broadcast for operations initiated by the processing unit 100 on an operation-by-operation basis from, for example, a group broadcast scope, a system-wide scope, or other scope; and (5) a fifth set of one or more mode bits indicating a group to which processing unit 100 belongs.

Each processing unit 100 further includes an instance of response logic 122, which implements a portion of a distributed coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices, such as I/O device 130. I/O controller 128 may issue operations and receive data on the X, Y, Z, A, and B links in response to requests by I/O device 130.

Figure 2:
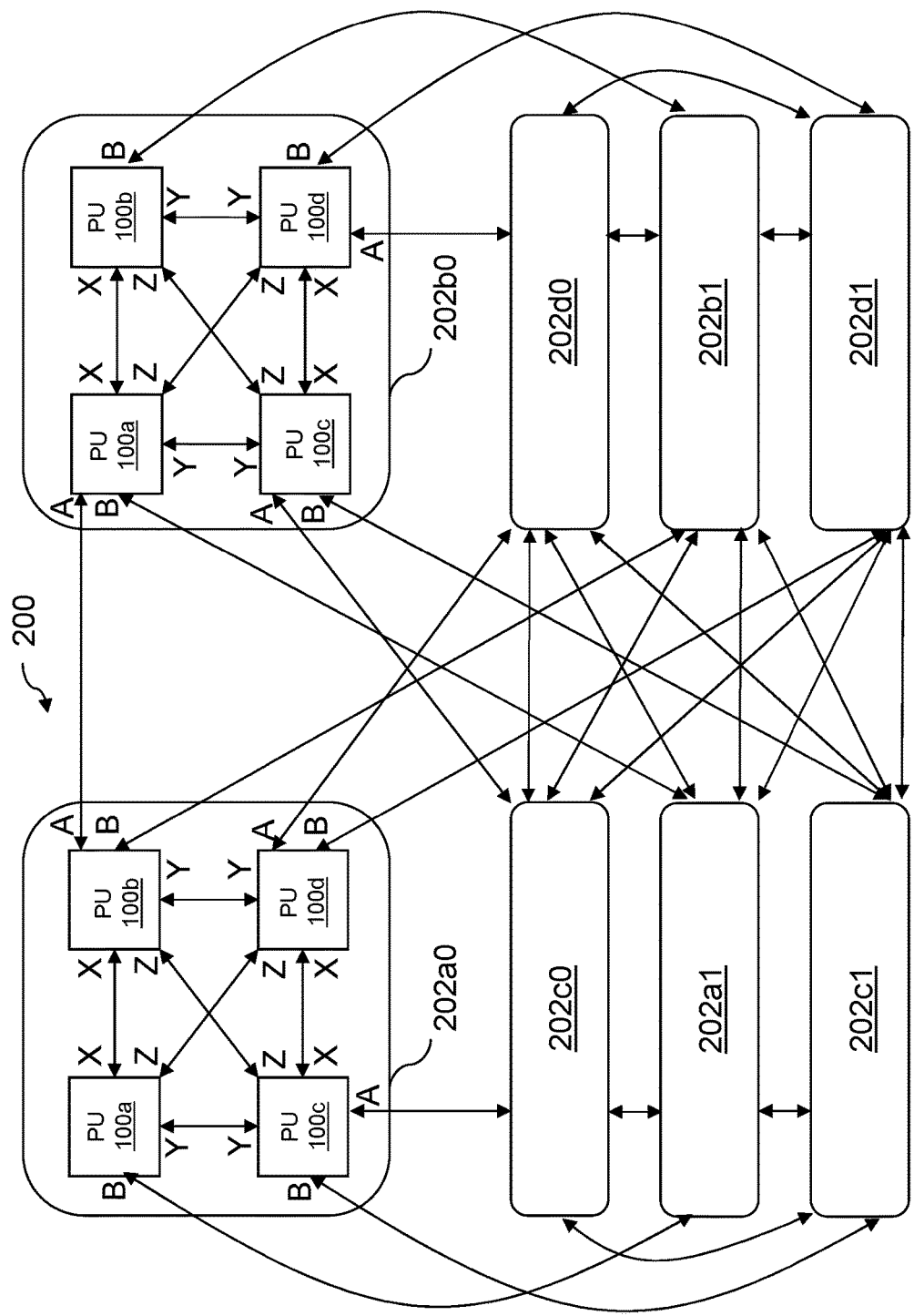
FIG. 2 is a high level block diagram of an exemplary data processing system according to one embodiment of the present disclosure.

Referring now to FIG. 2, there is depicted a block diagram of an exemplary embodiment of a data processing system 200 formed of multiple processing units 100 in accordance with the present disclosure. As shown, data processing system 200 includes eight processing nodes (groups) 202a0-202d0 and 202a1-202d1, which in the depicted embodiment, are each realized as a multi-chip module (MCM) comprising a package containing four processing units 100. The processing units 100 within each processing node (group) 202 are coupled for point-to-point communication by the processing units' X, Y, and Z links, as shown. Each processing unit 100 may be further coupled to processing units 100 in two different processing nodes (groups) 202 for point-to-point communication by the processing units' A and B links. Although illustrated in FIG. 2 with a double-headed arrow, it should be understood that each pair of X, Y, Z, A, and B links may be implemented as two uni-directional links, rather than as a bi-directional link.

General expressions for forming the topology shown in FIG. 2 can be given as follows:

Node[I][K].chip[J].link[K] connects to Node[J][K].chip [I].link[K], for all I≠J; and Node[I][K].chip[I].link[K] connects to Node[I][not K].chip[I].link[not K]; and Node[I][K].chip[I].link[not K] connects either to:
(1) Nothing in reserved for future expansion; or
(2) Node[extra][not K].chip[I].link[K], in case in which all links are fully utilized (i.e., nine 8-way nodes forming a 72-way system); and where I and J belong to the set {a, b, c, d} and K belongs to the set {A,B}.

Of course, alternative expressions can be defined to form other functionally equivalent topologies. Moreover, it should be appreciated that the depicted topology is representative but not exhaustive of data processing system topologies embodying techniques of the present disclosure and that other topologies are possible. In such alternative topologies, for example, the number of first tier and second tier links coupled to each processing unit 100 can be an arbitrary number, and the number of processing nodes 202 within each tier (i.e., I) need not equal the number of processing units 100 per processing node 100 (i.e., J).

Even though fully connected in the manner shown in FIG. 2, all processing nodes 202 need not communicate each operation to all other processing nodes 202. In particular, as noted above, processing units 100 may broadcast operations with a scope limited to their processing node (group) 202 or with a larger scope, such as multiple groups or a system-wide scope including all processing nodes 202.

Figure 14:
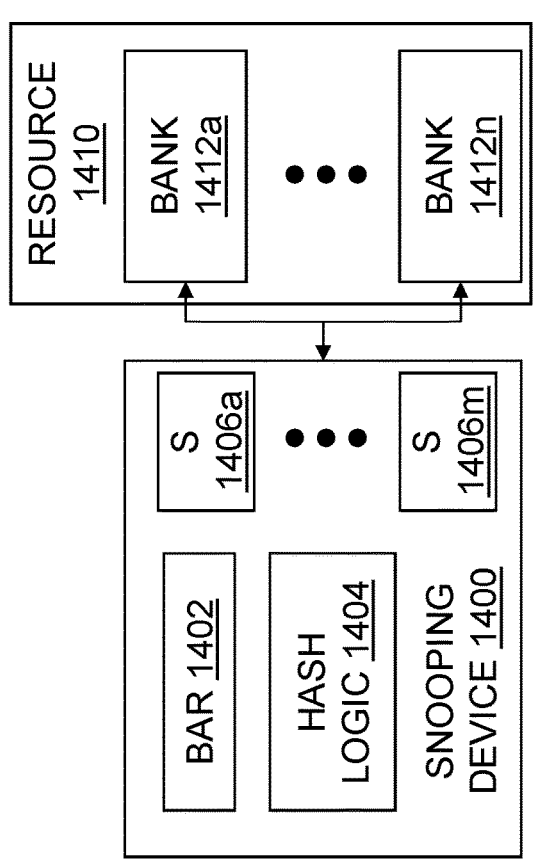
FIG. 14 is a more detailed block diagram of an exemplary snooping component of the data processing system of FIG. 2.

As shown in FIG. 14, an exemplary snooping device 1400 within data processing system 200, for example, snoopers 116 of L2 (or lower level) cache or snoopers 126 of an IMC 124, may include one or more base address registers (BARs) 1402 identifying one or more regions of the real address space containing real addresses for which snooping device 1400 is responsible. Snooping device 1400 may optionally further include hash logic 1404 that performs a hash function on real addresses falling within the region(s) of real address space identified by BAR 1902 to further qualify whether or not the snooping device 1400 is responsible for the addresses. Finally, snooping device 1400 includes a number of snoopers 1406a-1406m that access resource 1410 (e.g., L2 cache array and directory 114 or system memory 132) in response to snooped requests specifying request addresses qualified by BAR 1402 and hash logic 1404.

As shown, resource 1410 may have a banked structure including multiple banks 1412a-1412n each associated with a respective set of real addresses. As is known to those skilled in the art, such banked designs are often employed to support a higher arrival rate of requests for resource 1410 by effectively subdividing resource 1410 into multiple independently accessible resources. In this manner, even if the operating frequency of snooping device 1400 and/or resource 1410 are such that snooping device 1400 cannot service requests to access resource 1410 as fast as the maximum arrival rate of such requests, snooping device 1400 can service such requests without retry as long as the number of requests received for any bank 1412 within a given time interval does not exceed the number of requests that can be serviced by that bank 1412 within that time interval.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 2 discussed further herein.

Figure 3:
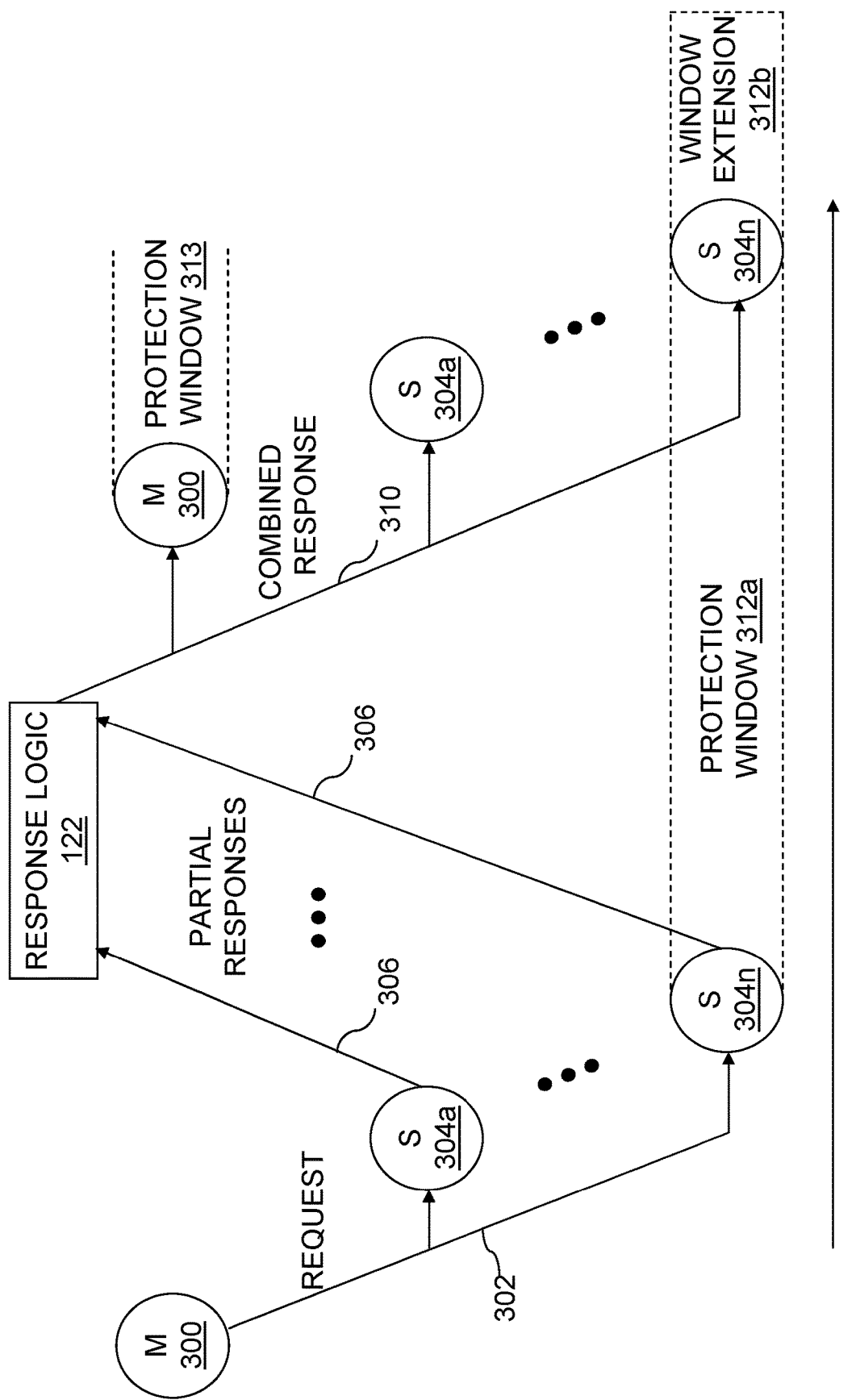
FIG. 3 is a time-space diagram of an exemplary operation including a request phase, a partial response phase, and a combined response phase.

Referring now to FIG. 3, there is depicted a time-space diagram of an exemplary operation on the interconnect fabric of data processing system 200 of FIG. 2. The operation begins when a master 300 (e.g., a master 112 of an L2 cache 110 or a master within an I/O controller 128) issues a request 302 on the interconnect fabric. Request 302 preferably includes at least a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |

TABLE I-continued

| Request | Description |
| --- | --- |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 302 is received by snoopers 304, for example, snoopers 116 of L2 caches 110 and snoopers 126 of IMCs 124, distributed throughout data processing system 200. In general, with some exceptions, snoopers 116 in the same L2 cache 110 as the master 112 of request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response 306 representing the response of at least that snooper 304 to request 302. A snooper 126 within an IMC 124 determines the partial response 306 to provide based, for example, upon whether the snooper 126 is responsible for the request address and whether it has resources available to service the request. A snooper 116 of an L2 cache 110 may determine its partial response 306 based on, for example, the availability of its L2 cache directory 114, the availability of a snoop logic instance within snooper 116 to handle the request, and the coherency state associated with the request address in L2 cache directory 114.

The partial responses 306 of snoopers 304 are logically combined either in stages or all at once by one or more instances of response logic 122 to determine a combined response (CR) 310 to request 302. In one preferred embodiment, which will be assumed hereinafter, the instance of response logic 122 responsible for generating combined response 310 is located in the processing unit 100 containing the master 300 that issued request 302. Response logic 122 provides combined response 310 to master 300 and snoopers 304 via the interconnect fabric to indicate the response (e.g., success, failure, retry, etc.) to request 302. If the CR 310 indicates success of request 302, CR 310 may indicate, for example, a data source for a requested memory block, a cache state in which the requested memory block is to be cached by master 300, and whether "cleanup" operations invalidating the requested memory block in one or more L2 caches 110 are required.

In response to receipt of combined response 310, one or more of master 300 and snoopers 304 typically perform one or more operations in order to service request 302. These operations may include supplying data to master 300, invalidating or otherwise updating the coherency state of data cached in one or more L2 caches 110, performing castout operations, writing back data to a system memory 132, etc. If required by request 302, a requested or target memory block may be transmitted to or from master 300 before or after the generation of combined response 310 by response logic 122.

In the following description, the partial response 306 of a snooper 304 to a request 302 and the operations performed by the snooper 304 in response to the request 302 and/or its combined response 310 will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of an HPC for the memory block, the LPC holds the true image of the memory block and has authority to grant or deny requests to generate an additional cached copy of the memory block. For a typical request in the data processing system embodiment of FIGS. 1 and 2, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 110. Although other indicators may be utilized to designate an HPC for a memory block, a preferred embodiment of the present invention designates the HPC, if any, for a memory block utilizing selected cache coherency state(s) within the L2 cache directory 114 of an L2 cache 110.

Still referring to FIG. 3, the HPC, if any, for a memory block referenced in a request 302, or in the absence of an HPC, the LPC of the memory block, preferably has the responsibility of protecting the transfer of ownership of a memory block, if necessary, in response to a request 302. In the exemplary scenario shown in FIG. 3, a snooper 304n at the HPC (or in the absence of an HPC, the LPC) for the memory block specified by the request address of request 302 protects the transfer of ownership of the requested memory block to master 300 during a protection window 312a that extends from the time that snooper 304n determines its partial response 306 until snooper 304n receives combined response 310 and during a subsequent window extension 312b extending a programmable time beyond receipt by snooper 304n of combined response 310. During protection window 312a and window extension 312b, snooper 304n protects the transfer of ownership by providing partial responses 306 to other requests specifying the same request address that prevent other masters from obtaining ownership (e.g., a retry partial response) until ownership has been successfully transferred to master 300. Master 300 likewise initiates a protection window 313 to protect its ownership of the memory block requested in request 302 following receipt of combined response 310.

Because snoopers 304 all have limited resources for handling the CPU and I/O requests described above, several different levels of partial responses and corresponding CRs are possible. For example, if a snooper 126 within a memory controller 124 that is responsible for a requested memory block has a queue available to handle a request, the snooper 126 may respond with a partial response indicating that it is able to serve as the LPC for the request. If, on the other hand, the snooper 126 has no queue available to handle the request, the snooper 126 may respond with a partial response indicating that it is the LPC for the memory block, but is unable to currently service the request. Similarly, a snooper 116 in an L2 cache 110 may require an available instance of snoop logic and access to L2 cache directory 114 in order to handle a request. Absence of access to either (or both) of these resources results in a partial response (and corresponding CR) signaling an inability to service the request due to absence of a required resource.

Figure 4:
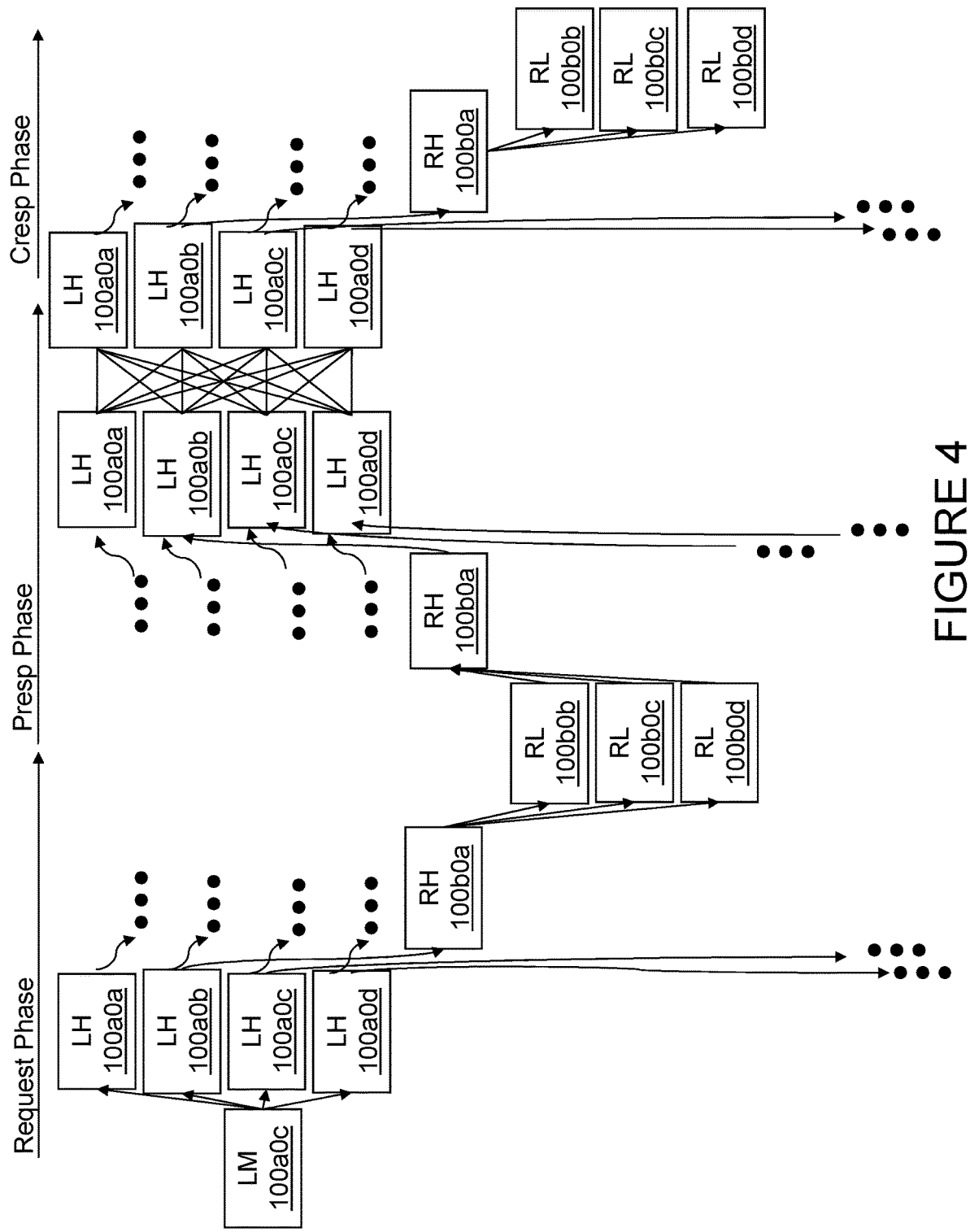
FIG. 4 is a time-space diagram of an exemplary operation of system-wide scope within the data processing system of FIG. 2.

Referring now to FIG. 4, there is illustrated a time-space diagram of an exemplary operation flow of an operation of system-wide scope in data processing system 200 of FIG. 2. In these figures, the various processing units 100 within data processing system 200 are tagged with two locational identifiers—a first identifying the processing node (group) 202 to which the processing unit 100 belongs and a second identifying the particular processing unit (chip) 100 within the processing node 202. Thus, for example, processing unit 100a0c refers to processing unit 100c of processing node 202a0. In addition, each processing unit 100 is tagged with a functional identifier indicating its function relative to the other processing units 100 participating in the operation. These functional identifiers include: (1) local master (LM), which designates the processing unit 100 that originates the operation, (2) local hub (LH), which designates a processing unit 100 that is in the same processing node 202 as the local master and that is responsible for transmitting the operation to another processing node 202 (it should be appreciated that a local master can also be a local hub), (3) remote hub (RH), which designates a processing unit 100 that is in a different processing node 202 than the local master and that is responsible to distribute the operation to other processing units 100 in its processing node 202, and (4) remote leaf (RL), which designates a processing unit 100 that is in a different processing node 202 from the local master and that is not a remote hub.

As shown in FIG. 4, the exemplary operation has at least three phases as described above with reference to FIG. 3, namely, a request (or address) phase, a partial response (Presp) phase, and a combined response (Cresp) phase. These three phases preferably occur in the foregoing order and do not overlap. The operation may additionally have a data phase, which may optionally overlap with any of the request, partial response and combined response phases.

Still referring to FIG. 4, the request phase begins when a local master 100a0c (i.e., processing unit 100c of processing node 202a0) performs a synchronized broadcast of a request, for example, a read request, to each of the local hubs 100a0a, 100a0b, 100a0c, and 100a0d within its processing node 202a0. It should be noted that the list of local hubs includes local hub 100a0c, which is also the local master. As described further below, this internal transmission is advantageously employed to synchronize the operation of local hub 100a0c with local hubs 100a0a, 100a0b, and 100a0d so that the timing constraints discussed below can be more easily satisfied.

In response to receiving a request, each local hub 100 that is coupled to a remote hub 100 by its A or B links transmits the operation to its remote hub(s) 100. Thus, local hub 100a0a makes no transmission of the operation on its outbound A link, but transmits the operation via its outbound B link to a remote hub within processing node 202a1. Local hubs 100a0b, 100a0c, and 100a0d transmit the operation via their respective outbound A and B links to remote hubs in processing nodes 202b0 and 202b1, processing nodes 202c0 and 202c1, and processing nodes 202d0 and 202d1, respectively. Each remote hub 100 receiving the operation in turn transmits the operation to each remote leaf 100 in its processing node 202. Thus, for example, local hub 100b0a transmits the operation to remote leaves 100b0b, 100b0c, and 100b0d. In this manner, the operation is efficiently broadcast to all processing units 100 within data processing system 200 utilizing transmission over no more than three links.

Following the request phase, the partial response (Presp) phase occurs, as shown in FIG. 4. In the partial response phase, each remote leaf 100 evaluates the operation and provides its partial response to the operation to its respective remote hub 100. For example, remote leaves 100b0b, 100b0c, and 100b0d transmit their respective partial responses to remote hub 100b0a. Each remote hub 100 in turn transmits these partial responses, as well as its own partial response, to a respective one of local hubs 100a0a, 100a0b, 100a0c, and 100a0d. Local hubs 100a0a, 100a0b, 100a0c, and 100a0d then broadcast these partial responses, as well as their own partial responses, to each local hub 100 in processing node 202a0. It should be noted that the broadcasts of partial responses by the local hubs 100 within processing node 202a0 include, for timing reasons, the self-broadcast by each local hub 100 of its own partial response.

As will be appreciated, the collection of partial responses in the manner shown can be implemented in a number of different ways. For example, it is possible to communicate an individual partial response back to each local hub from each other local hub, remote hub, and remote leaf. Alternatively, for greater efficiency, it may be desirable to accumulate partial responses as they are communicated back to the local hubs. In order to ensure that the effect of each partial response is accurately communicated back to local hubs 100, it is preferred that the partial responses be accumulated, if at all, in a non-destructive manner, for example, utilizing a logical OR function and an encoding in which no relevant information is lost when subjected to such a function (e.g., a "one-hot" encoding).

As further shown in FIG. 4, response logic 122 at each local hub 100 within processing node 202a0 compiles the partial responses of the other processing units 100 to obtain a combined response representing the system-wide response to the request. Local hubs 100a0a-100a0d then broadcast the combined response to all processing units 100 following the same paths of distribution as employed for the request phase. Thus, the combined response is first broadcast to remote hubs 100, which in turn transmit the combined response to each remote leaf 100 within their respective processing nodes 202. For example, remote hub 100a0b transmits the combined response to remote hub 100b0a, which in turn transmits the combined response to remote leaves 100b0b, 100b0c, and 100b0d.

As noted above, servicing the operation may require an additional data phase. For example, if the operation is a read-type operation, such as a read or RWITM operation, remote leaf 100b0d may source the requested memory block to local master 100a0c via the links connecting remote leaf 100b0d to remote hub 100b0a, remote hub 100b0a to local hub 100a0b, and local hub 100a0b to local master 100a0c. Conversely, if the operation is a write-type operation, for example, a cache castout operation writing a modified memory block back to the system memory 132 of remote leaf 100b0b, the memory block is transmitted via the links connecting local master 100a0c to local hub 100a0b, local hub 100a0b to remote hub 100b0a, and remote hub 100b0a to remote leaf 100b0b.

Figure 5:
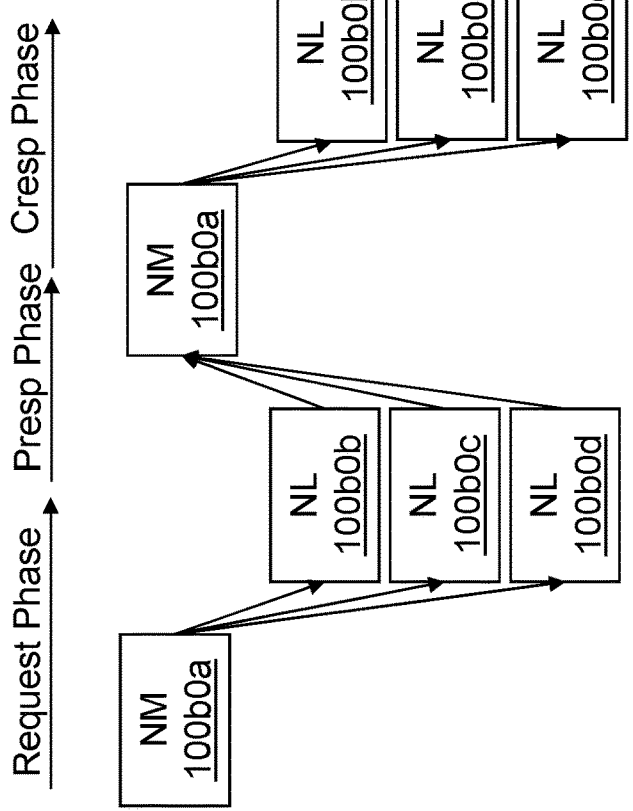
FIG. 5 is a time-space diagram of an exemplary operation of group scope within the data processing system of FIG. 2.

Referring now to FIG. 5, there is illustrated a time-space diagram of an exemplary operation flow of an operation of group scope in data processing system 200 of FIG. 2. In these figures, the various processing units 100 within data processing system 200 are tagged with two locational identifiers—a first identifying the processing node (group) 202 to which the processing unit 100 belongs and a second identifying the particular processing unit 100 within the processing node (group) 202. Thus, for example, processing unit 100b0a refers to processing unit 100a of processing node 202b0. In addition, each processing unit 100 is tagged with a functional identifier indicating its function relative to the other processing units 100 participating in the operation. These functional identifiers include: (1) node master (NM), which designates the processing unit 100 that originates an operation of node-only (group) scope, and (2) node leaf (NL), which designates a processing unit 100 that is in the same processing node 202 as the node master and that is not the node (group) master.

As shown in FIG. 5, the exemplary group operation has at least three phases as described above: a request (or address) phase, a partial response (Presp) phase, and a combined response (Cresp) phase. Again, these three phases preferably occur in the foregoing order and do not overlap. The operation may additionally have a data phase, which may optionally overlap with any of the request, partial response and combined response phases.

Still referring to FIG. 5, the request phase begins when a node master 100b0a (i.e., processing unit 100a of processing node 202b0), which functions much like a remote hub in the operational scenario of FIG. 5, performs a synchronized broadcast of a request, for example, a read request, to each of the node leaves 100b0b, 100b0c, and 100b0d within its processing group 202b0. It should be noted that, because the scope of the broadcast transmission is limited to a single node (group), no internal transmission of the request within node (group) master 100b0a is employed to synchronize off-group transmission of the request.

Following the request phase, the partial response (Presp) phase occurs, as shown in FIG. 5. In the partial response phase, each of node leaves 100b0b, 100b0c, and 100b0d evaluates the operation and provides its partial response to the operation to node (group) master 100b0a. Next, as further shown in FIG. 5, response logic 122 at node (group) master 100b0a within processing node 202b0 compiles the partial responses of the other processing units 100 to obtain a combined response representing the group-wide response to the request. Node (group) master 100b0a then broadcasts the combined response to all node leaves 100b0b, 100b0c, and 100b0d utilizing the X, Y and Z links of node (group) master 100b0a.

As noted above, servicing the operation may require an additional data phase. For example, if the operation is a read-type operation, such as a read or RWITM operation, node leaf 100b0d may source the requested memory block to node (group) master 100b0a via the Z link connecting node leaf 100b0d to node (group) master 100b0a. Conversely, if the operation is a write-type operation, for example, a cache castout operation writing a modified memory block back to the system memory 132 of remote leaf 100b0b, the memory block is transmitted via the X link connecting node (group) master 100b0a to node leaf 100b0b.

Figure 6:
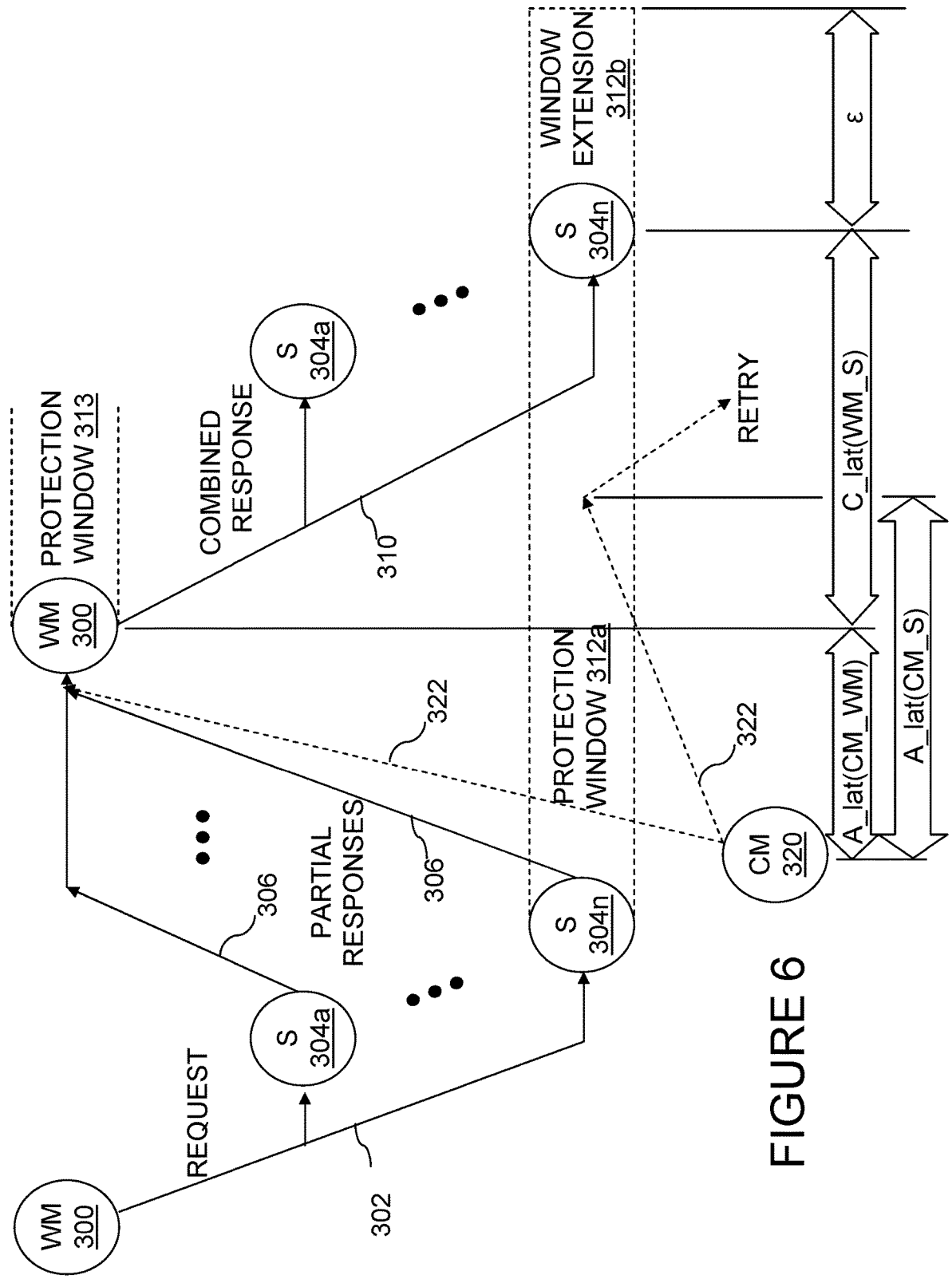
FIG. 6 is a time-space diagram of an exemplary operation, illustrating the timing constraints of an arbitrary data processing system topology.

As described above with reference to FIG. 3, coherency is maintained during the "handoff" of coherency ownership of a memory block from a snooper 304n to a requesting master 300 in the possible presence of other masters competing for ownership of the same memory block through protection window 312a, window extension 312b, and protection window 313. For example, as shown in FIG. 6, protection window 312a and window extension 312b must together be of sufficient duration to protect the transfer of coherency ownership of the requested memory block from snooper 304n to winning master (WM) 300 in the presence of a competing request 322 by a competing master (CM) 320. To ensure that protection window 312a and window extension 312b have sufficient duration to protect the transfer of ownership of the requested memory block from snooper 304n to winning master 300, the latency of communication between processing units 100 in accordance with FIGS. 4 and 5 is preferably constrained such that the following conditions are met:

$$A\_lat(CM\_S) \le A\_lat(CM\_WM) + C\_lat(WM\_S) + \varepsilon,$$

where A_lat(CM_S) is the address latency of any competing master (CM) 320 to the snooper (S) 304n owning coherence of the requested memory block, A_lat(CM_WM) is the address latency of any competing master (CM) 320 to the "winning" master (WM) 300 that is awarded coherency ownership by snooper 304n, C_lat(WM_S) is the combined response latency from the time that the combined response is received by the winning master (WM) 300 to the time the combined response is received by the snooper (S) 304n owning the requested memory block, and c is the duration of window extension 312b.

If the foregoing timing constraint, which is applicable to a system of arbitrary topology, is not satisfied, the request 322 of the competing master 320 may be received (1) by winning master 300 prior to winning master 300 assuming coherency ownership and initiating protection window 312b and (2) by snooper 304n after protection window 312a and window extension 312b end. In such cases, neither winning master 300 nor snooper 304n will provide a partial response to competing request 322 that prevents competing master 320 from assuming coherency ownership of the memory block and reading non-coherent data from memory. However, to avoid this coherency error, window extension 312b can be programmably set (e.g., by appropriate setting of configuration register 123) to an arbitrary length epsilon ($\varepsilon$) to compensate for latency variations or the shortcomings of a physical implementation that may otherwise fail to satisfy the timing constraint that must be satisfied to maintain coherency. Thus, by solving the above equation for $\varepsilon$, the ideal length of window extension 312b for any implementation can be determined. For the data processing system embodiments of FIG. 2, it is preferred if $\varepsilon$ has a duration equal to the latency of one first tier link chip-hop for broadcast operations having a scope including multiple processing nodes 202 and has a duration of zero for operations of group scope.

Several observations may be made regarding the foregoing timing constraint. First, the address latency from the competing master 320 to the owning snooper 304a has no necessary lower bound, but must have an upper bound. The upper bound is designed for by determining the worst case latency attainable given, among other things, the maximum possible oscillator drift, the longest links coupling processing units 100, the maximum number of accumulated stalls, and guaranteed worst case throughput. In order to ensure the upper bound is observed, the interconnect fabric must ensure non-blocking behavior.

Second, the address latency from the competing master 320 to the winning master 300 has no necessary upper bound, but must have a lower bound. The lower bound is determined by the best case latency attainable, given, among other things, the absence of stalls, the shortest possible link between processing units 100 and the slowest oscillator drift given a particular static configuration.

Although for a given operation, each of the winning master 300 and competing master 320 has only one timing bound for its respective request, it will be appreciated that during the course of operation any processing unit 100 may be a winning master for some operations and a competing (and losing) master for other operations. Consequently, each processing unit 100 effectively has an upper bound and a lower bound for its address latency.

Third, the combined response latency from the time that the combined response is generated to the time the combined response is observed by the winning master 300 has no necessary lower bound (the combined response may arrive at the winning master 300 at an arbitrarily early time), but must have an upper bound. By contrast, the combined response latency from the time that a combined response is generated until the combined response is received by the snooper 304*n* has a lower bound, but no necessary upper bound (although one may be arbitrarily imposed to limit the number of operations concurrently in flight).

Fourth, there is no constraint on partial response latency. That is, because all of the terms of the timing constraint enumerated above pertain to request/address latency and combined response latency, the partial response latencies of snoopers 304 and competing master 320 to winning master 300 have no necessary upper or lower bounds.

The first tier and second tier links connecting processing units 100 may be implemented in a variety of ways to obtain the topologies depicted in FIG. 2 and to meet the timing constraints illustrated in FIG. 6. In one preferred embodiment, each inbound and outbound first tier (X, Y and Z) link and each inbound and outbound second tier (A and B) link is implemented as a uni-directional 8-byte bus containing a number of different virtual channels or tenures to convey address, data, control and coherency information.

Figure 7:
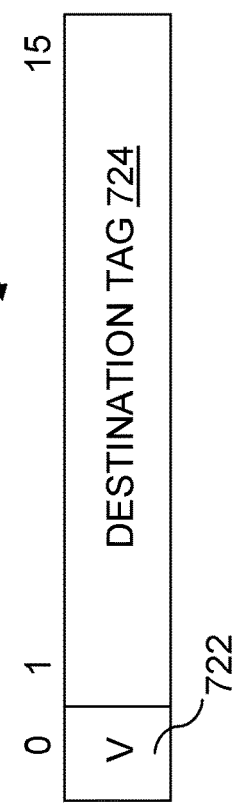
FIG. 7 is an exemplary embodiment of a partial response field for a write request that is included within the link information allocation.

FIG. 7 illustrates an exemplary embodiment of a write request partial response 720, which may be transported within either a local partial response field 708*a*, 708*b* or a remote partial response field 712*a*, 712*b* in response to a write request. As shown, write request partial response 720 is two bytes in length and includes a 15-bit destination tag field 724 for specifying the tag of a snooper (e.g., an IMC snooper 126) that is the destination for write data and a 1-bit valid (V) flag 722 for indicating the validity of destination tag field 724.

Figure 8:
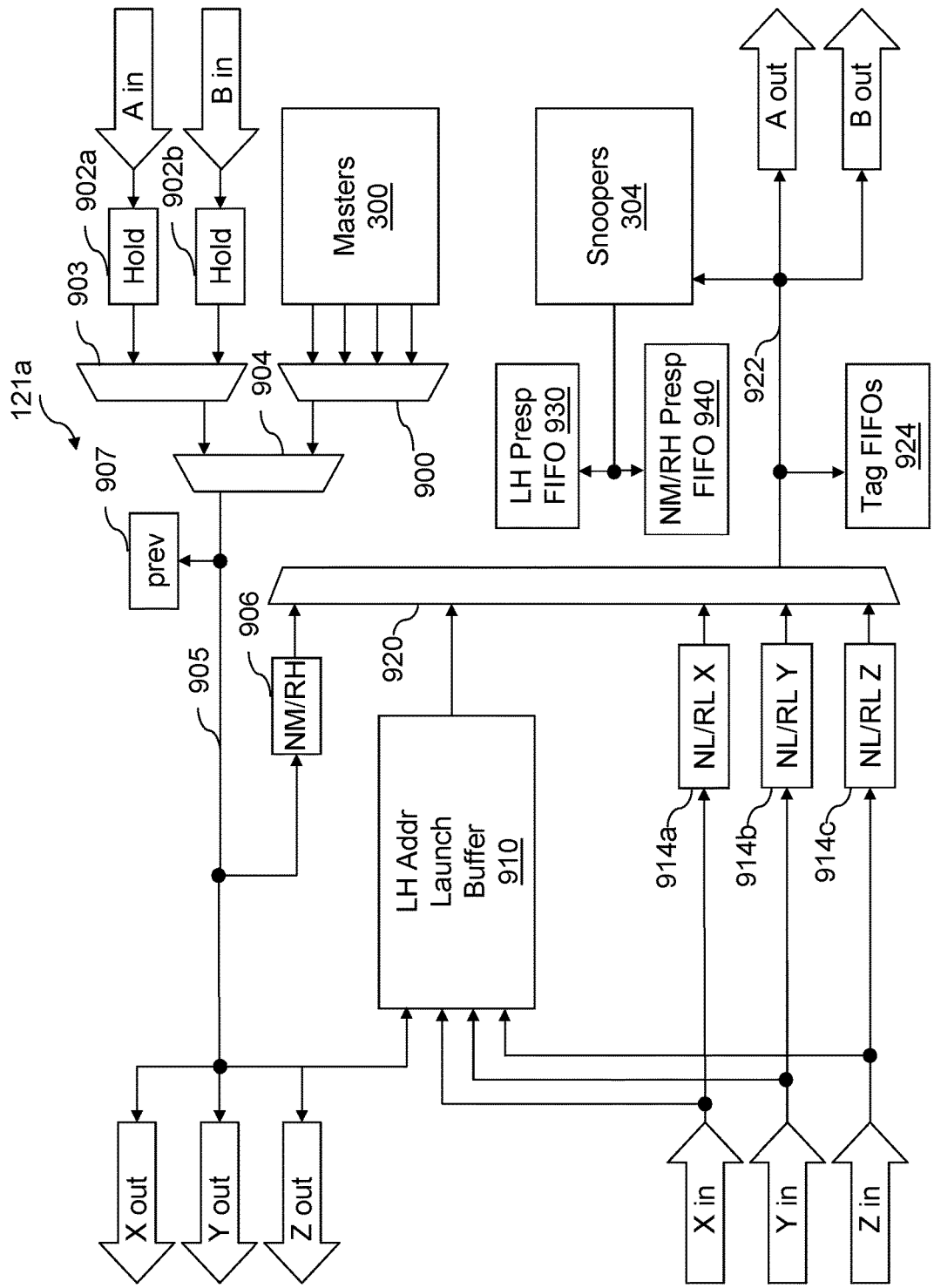
FIG. 8 is a block diagram illustrating a portion of the interconnect logic of FIG. 1 utilized in the request phase of an operation.

Referring now to FIG. 8, there is depicted a block diagram illustrating request logic 121*a* within interconnect logic 120 of FIG. 1 utilized in request phase processing of an operation. As shown, request logic 121*a* includes a master multiplexer 900 coupled to receive requests by the masters 300 of a processing unit 100 (e.g., masters 112 within L2 cache 110 and masters within I/O controller 128). The output of master multiplexer 900 forms one input of a request multiplexer 904. The second input of request multiplexer 904 is coupled to the output of a remote hub multiplexer 903 having its inputs coupled to the outputs of hold buffers 902*a*, 902*b*, which are in turn coupled to receive and buffer requests on the inbound A and B links, respectively. Remote hub multiplexer 903 implements a fair allocation policy, described further below, that fairly selects among the requests received from the inbound A and B links that are buffered in hold buffers 902*a*-902*b*. If present, a request presented to request multiplexer 904 by remote hub multiplexer 903 is always given priority by request multiplexer 904. The output of request multiplexer 904 drives a request bus 905 that is coupled to each of the outbound X, Y and Z links, a node master/remote hub (NM/RH) hold buffer 906, and the local hub (LH) address launch buffer 910. A previous request FIFO buffer 907, which is also coupled to request bus 905, preferably holds a small amount of unit ID information for each of a number of previous address tenures to provide fairness or priority between masters 300. Certain masters 300 may require a Quality Of Service (QOS) compared with counterparts. Some embodiments may have several masters 300 physically sharing one bus coming into arbiter 1032 alongside single requesters. In such cases, arbiter 1032 references buffer 907 to adjust the weighting for local masters.

The inbound first tier (X, Y, and Z) links are each coupled to the LH address launch buffer 910, as well as a respective one of node leaf/remote leaf (NL/RL) hold buffers 914*a*-914*c*. The outputs of NM/RH hold buffer 906, LH address launch buffer 910, and NL/RL hold buffers 914*a*-914*c* all form inputs of a snoop multiplexer 920. The output of snoop multiplexer 920 drives a snoop bus 922 to which tag FIFO queues 924, the snoopers 304 (e.g., snoopers 116 of L2 cache 110 and snoopers 126 of IMC 124) of the processing unit 100, and the outbound A and B links are coupled. Snoopers 304 are further coupled to and supported by local hub (LH) partial response FIFO queues 930 and node master/remote hub (NM/RH) partial response FIFO queue 940. In one or more embodiments buffers 902, 906, and 914*a*-914*c* are relatively small in order to minimize communication latency. In one embodiment, each of buffers 902, 906, and 914*a*-914*c* is sized to hold only the address tenure(s) of a single frame of the selected link information allocation.

Figure 9:
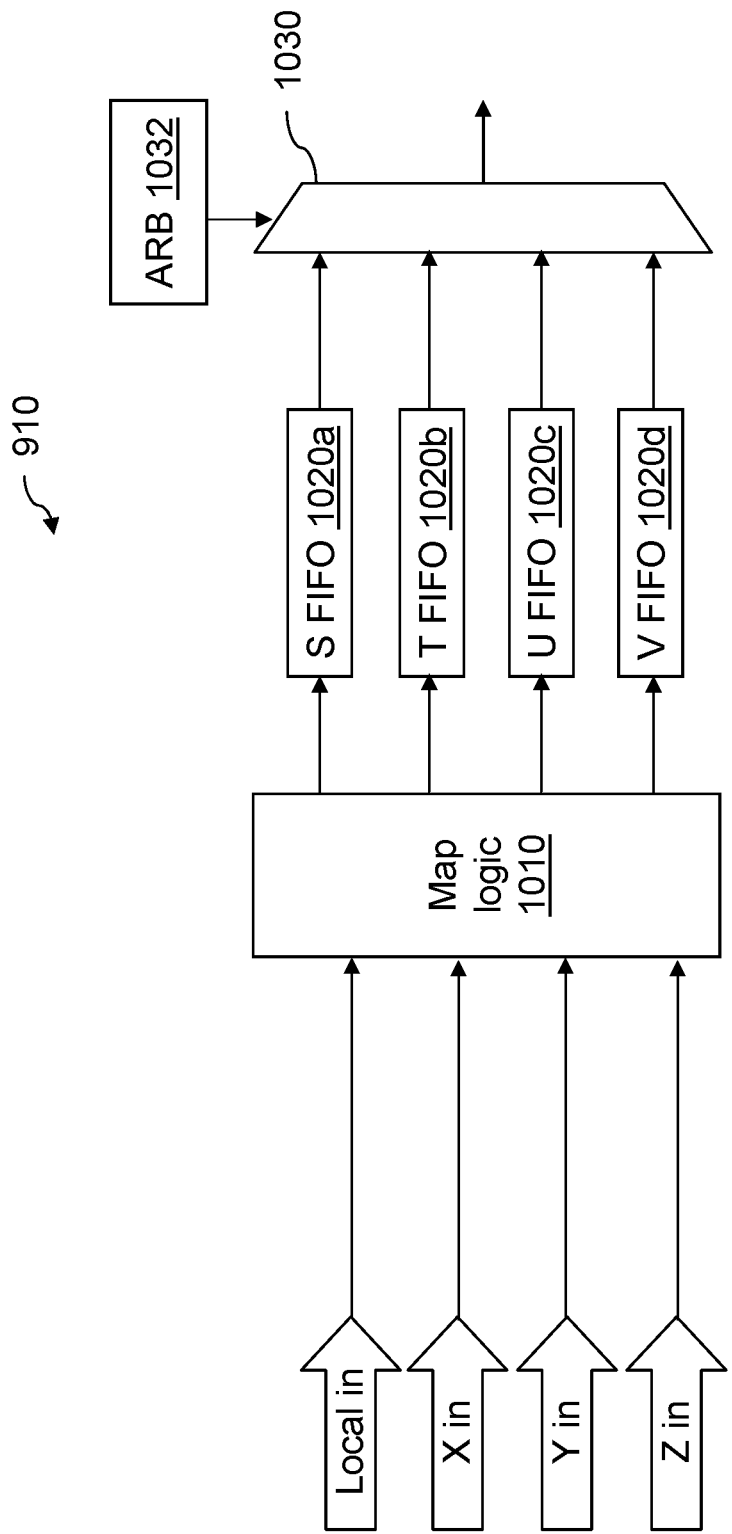
FIG. 9 is a more detailed block diagram of the local hub address launch buffer of FIG. 8.

With reference now to FIG. 9, there is illustrated a more detailed block diagram of local hub (LH) address launch buffer 910 of FIG. 8. As depicted, the local and inbound X, Y, and Z link inputs of the LH address launch buffer 910 form inputs of a map logic 1010, which places requests received on each particular input into a respective corresponding position-dependent FIFO queue 1020*a*-1020*d*. In the depicted nomenclature, the processing unit 100*a* in the upper left-hand corner of a processing node/MCM 202 is the "S" chip; the processing unit 100*b* in the upper right-hand corner of the processing node/MCM 202 is the "T" chip; the processing unit 100*c* in the lower left-hand corner of a processing node/MCM 202 is the "U" chip; and the processing unit 100*d* in the lower right-hand corner of the processing node 202 is the "V" chip. Thus, for example, for local master/local hub 100*ac*, requests received on the local input are placed by map logic 1010 in U FIFO queue 1020*c*, and requests received on the inbound Y link are placed by map logic 1010 in S FIFO queue 1020*a*. Map logic 1010 is employed to normalize input flows so that arbitration logic 1032, described below, in all local hubs 100 is synchronized to handle requests identically without employing any explicit inter-communication.

The outputs of position-dependent FIFO queues 1020*a*-1020*d* form the inputs of local hub request multiplexer 1030, which selects one request from among position-dependent FIFO queues 1020*a*-1020*d* for presentation to snoop multiplexer 920 in response to a select signal generated by arbiter 1032, which implements a fair arbitration policy in selecting among position-dependent FIFO queues 1020*a*-1020*d*. In one or more embodiments, commands are issued at a certain link rate. If a dispatch rate out of position-dependent FIFO queues 1020*a*-1020*d* falls behind the incoming rate, commands are dropped by arbiter 1032.

Figure 9A:
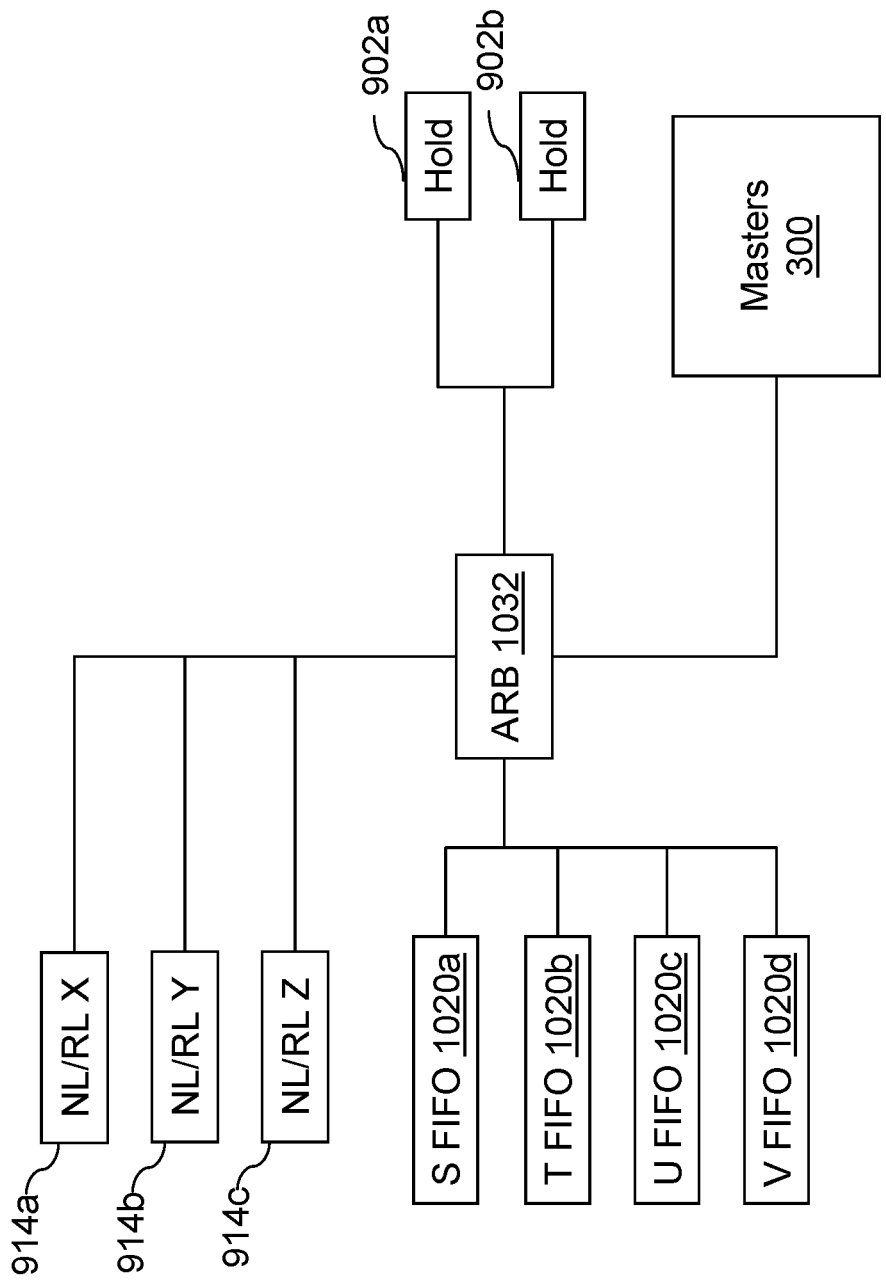
FIG. 9A is a block diagram illustrating signals received by an arbiter implemented within the local hub address launch buffer of FIG. 8.

As is illustrated in FIG. 9A, arbiter 1032 receives various request signals from hold buffers 902*a*, 902*b*, NL/RL hold buffers 914a-914c, LH hold buffers 1020a-1020d, and masters 300. As is discussed further below, arbiter 1032 is configured to drop commands based on the various request signals. As noted above, as more hops are taken by a broadcast command the possibility of an over-commit drop of the broadcast command increases. According to various aspects of the present disclosure, arbiter 1032 is configured to take into consideration the number of hops traversed by a given command in determining whether the given command should be dropped when an over-commit has occurred. According to one or more aspects of the present disclosure, arbiter 1032 takes into account a relative position between queued commands (i.e., commands queued in FIFO queue 1020) when considering which command or commands to drop. By considering the number of hops that a command has traversed a success rate for multi-hop commands may be improved. According to one or more embodiments, arbiter 1032 implements a weighting factor that represents the number of hops that a command has traversed that is utilized in determining whether a given command should be dropped when an over-commit occurs. In one or more embodiments, fairness may be achieved by also considering the processing units being arbitrated, such that commands from a given processing unit are not always dropped when an over-commit occurs.

On any incoming link, a command tag (which includes a chip ID and a group (node) ID) is decoded and sent to arbiter 1032. As noted above, arbiter 1032 is configured to assign additional weight to multi-hop commands, based on how many hops the command has traversed. As one example, each additional weight may indicate that an extra arbitration slot may be used for a command. In one or more embodiments, arbiter 1032 arbitrates local chip commands and one hop commands together. In various embodiments, as groups are added or deleted dynamically to a system, weights are adjusted accordingly. In one or more embodiments, a 'hot-plug' configuration register may be implemented to track all available groups in a system and values in the register can be used to decrease or increase weights to provide fairness to 1-hop commands.

Figure 10:
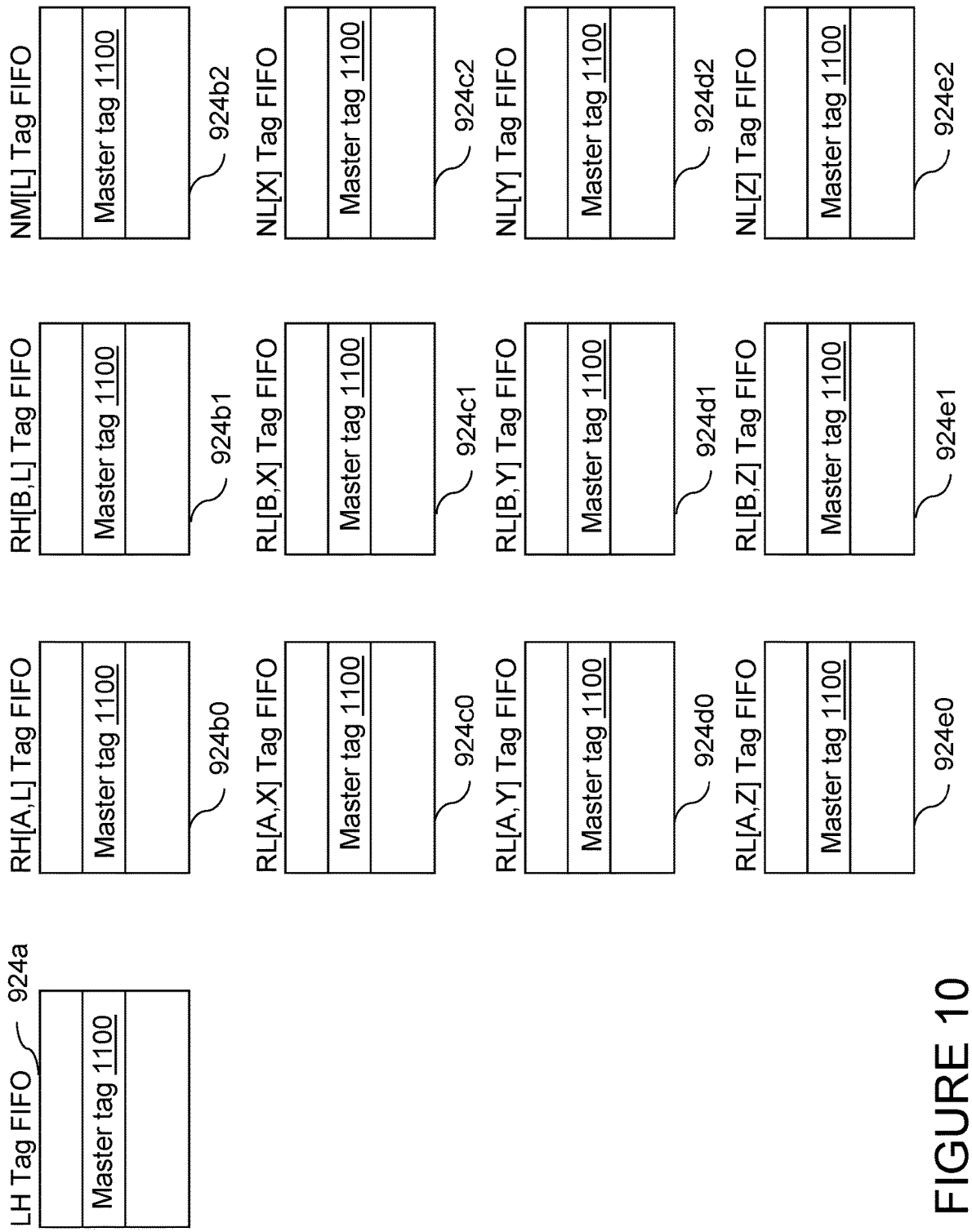
FIG. 10 is a more detailed block diagram of the tag FIFO queues of FIG. 8.

Referring now to FIG. 10, there is depicted a more detailed block diagram of tag FIFO queues 924 of FIG. 8. As shown, tag FIFO queues 924 include a local hub (LH) tag FIFO queue 924a, remote hub (RH) tag FIFO queues 924b0-924b1, node master (NM) tag FIFO queue 924b2, remote leaf (RL) tag FIFO queues 924c0-924c1, 924d0-924d1 and 924e0-924e1, and node leaf (NL) tag FIFO queues 924c2, 924d2 and 924e2. The master tag of a request of an operation of system-wide scope is deposited in each of tag FIFO queues 924a, 924b0-924b1, 924c0-924c1, 924d0-924d1 and 924e0-924e1 when the request is received at the processing unit(s) 100 serving in each of these given roles (LH, RH, and RL) for that particular request. Similarly, the master tag of a request of an operation of node-only scope is deposited in each of tag FIFO queues 924b2, 924c2, 924d2 and 924e2 when the request is received at the processing unit(s) 100 serving in each of these given roles (NM and NL) for that particular request. The master tag is retrieved from each of tag FIFO queues 924 when the combined response is received at the associated processing unit 100. Thus, rather than transporting the master tag with the combined response, master tags are retrieved by a processing unit 100 from its tag FIFO queue 924 as needed, resulting in bandwidth savings on the first and second tier links. Given that the order in which a combined response is received at the various processing units 100 is identical to the order in which the associated request was received, a FIFO policy for allocation and retrieval of the master tag can advantageously be employed.

LH tag FIFO queue 924a includes a number of entries, each including a master tag field 1100 for storing the master tag of a request launched by arbiter 1032. Each of tag FIFO queues 924b0-924b1 similarly includes multiple entries, each including at least a master tag field 1100 for storing the master tag of a request of system-wide scope received by a remote hub 100 via a respective one of the inbound A and B links. Tag FIFO queues 924c0-924c1, 924d0-924d1 and 924e0-924e1 are similarly constructed and each hold master tags of requests of system-wide scope received by a remote leaf 100 via a unique pairing of inbound first and second tier links. For requests of node-only broadcast scope, NM tag FIFO queues 924b2 holds the master tags of requests originated by the node master 100, and each of NL tag FIFO queues 924c2, 924d2 and 924e2 provides storage for the master tags of requests received by a node leaf 100 on a respective one of the first tier X, Y, and Z links.

Entries within LH tag FIFO queue 924a have the longest tenures for system-wide broadcast operations, and NM tag FIFO queue 924b2 have the longest tenures for node-only broadcast operations. Consequently, the depths of LH tag FIFO queue 924a and NM tag FIFO queue 924b2 respectively limit the number of concurrent operations of system-wide scope that a processing node 202 can issue on the interconnect fabric and the number of concurrent operations of node-only scope that a given processing unit 100 can issue on the interconnect fabric. These depths have no necessary relationship and may be different. However, the depths of tag FIFO queues 924b0-924b1, 924c0-924c1, 924d0-924d1 and 924e0-924e1 are preferably designed to be equal to that of LH tag FIFO queue 924a, and the depths of tag FIFO queues 924c2, 924d2 and 924e2 are preferably designed to be equal to that of NM tag FIFO queue 924b2.

Figure 11:
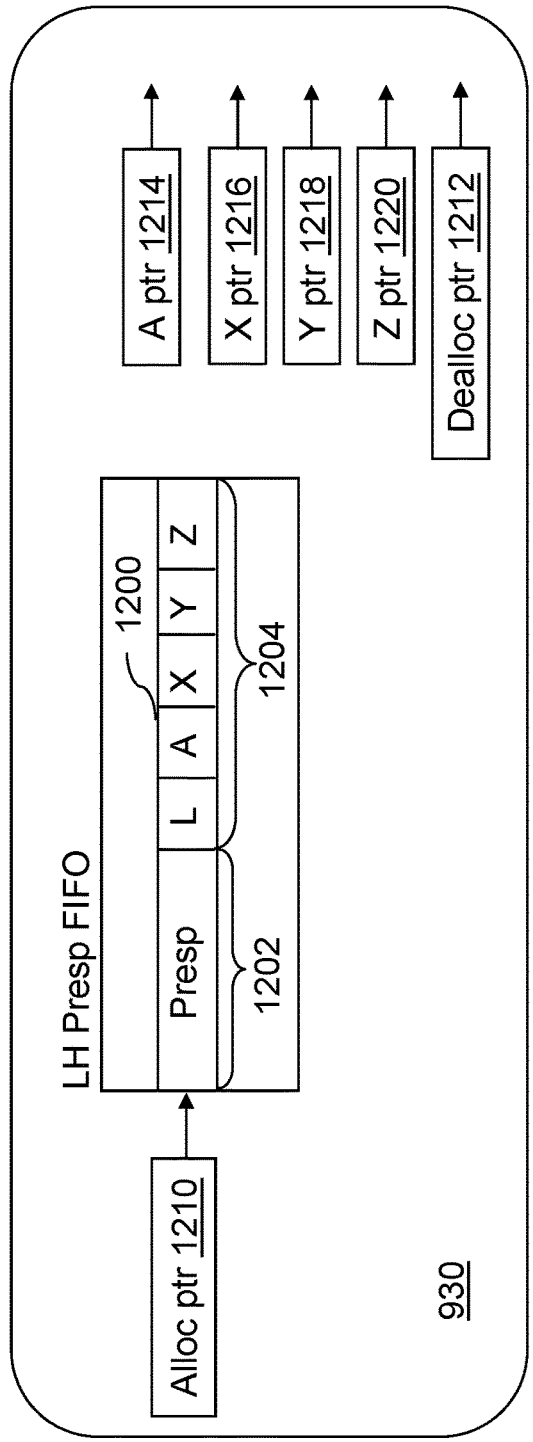
FIGS. 11 and 12 are more detailed block diagrams of the local hub partial response FIFO queue and remote hub partial response FIFO queue of FIG. 8, respectively.
Figure 12:
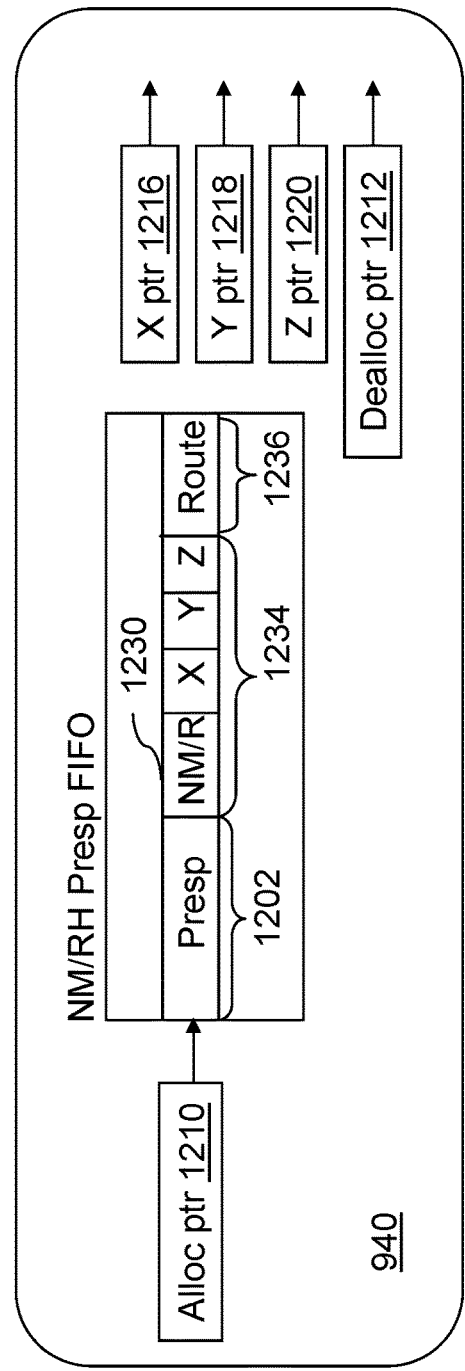

With reference now to FIGS. 11 and 12, there are illustrated more detailed block diagrams of exemplary embodiments of the local hub (LH) partial response FIFO queue 930 and node master/remote hub (NM/RH) partial response FIFO queue 940 of FIG. 8. As indicated, LH partial response FIFO queue 930 includes a number of entries 1200 that each includes a partial response field 1202 for storing an accumulated partial response for a request and a response flag array 1204 having respective flags for each of the 6 possible sources from which the local hub 100 may receive a partial response (i.e., local (L), first tier X, Y, Z links, and second tier A and B links) at different times or possibly simultaneously. Entries 1200 within LH partial response FIFO queue 930 are allocated via an allocation pointer 1210 and deallocated via a deallocation pointer 1212. Various flags comprising response flag array 1204 are accessed utilizing A pointer 1214, B pointer 1215, X pointer 1216, Y pointer 1218, and Z pointer 1220.

As described further below, when a partial response for a particular request is received by partial response logic 121b at a local hub 100, the partial response is accumulated within partial response field 1202, and the link from which the partial response was received is recorded by setting the corresponding flag within response flag array 1204. The corresponding one of pointers 1214, 1215, 1216, 1218 and 1220 is then advanced to the subsequent entry 1200.

Of course, as described above, each processing unit 100 need not be fully coupled to other processing units 100 by each of its 5 inbound (X, Y, Z, A and B) links. Accordingly, flags within response flag array 1204 that are associated with unconnected links are ignored. The unconnected links, if any, of each processing unit 100 may be indicated, for example, by the configuration indicated in configuration register 123, which may be set, for example, by boot code at system startup or by the operating system when partitioning data processing system 200.

As can be seen by comparison of FIG. 12 and FIG. 11, NM/RH partial response FIFO queue 940 is constructed similarly to LH partial response FIFO queue 930. NM/RH partial response FIFO queue 940 includes a number of entries 1230 that each includes a partial response field 1202 for storing an accumulated partial response and a response flag array 1234 having respective flags for each of the up to 4 possible sources from which the node master or remote hub 100 may receive a partial response (i.e., node master (NM)/remote (R), and first tier X, Y, and Z links). In addition, each entry 1230 includes a route field 1236 identifying whether the operation is a node-only, group, or system-wide broadcast operation and, for system-wide broadcast operations, which of the inbound second tier links the request was received upon (and thus which of the outbound second tier links the accumulated partial response will be transmitted on). Entries 1230 within NM/RH partial response FIFO queue 940 are allocated via an allocation pointer 1210 and deallocated via a deallocation pointer 1212. Various flags comprising response flag array 1234 are accessed and updated utilizing X pointer 1216, Y pointer 1218, and Z pointer 1220.

As noted above with respect to FIG. 11, each processing unit 100 need not be fully coupled to other processing units 100 by each of its first tier X, Y, and Z links. Accordingly, flags within response flag array 1204 that are associated with unconnected links are ignored. The unconnected links, if any, of each processing unit 100 may be indicated, for example, by the configuration indicated in configuration register 123.

Figure 13:
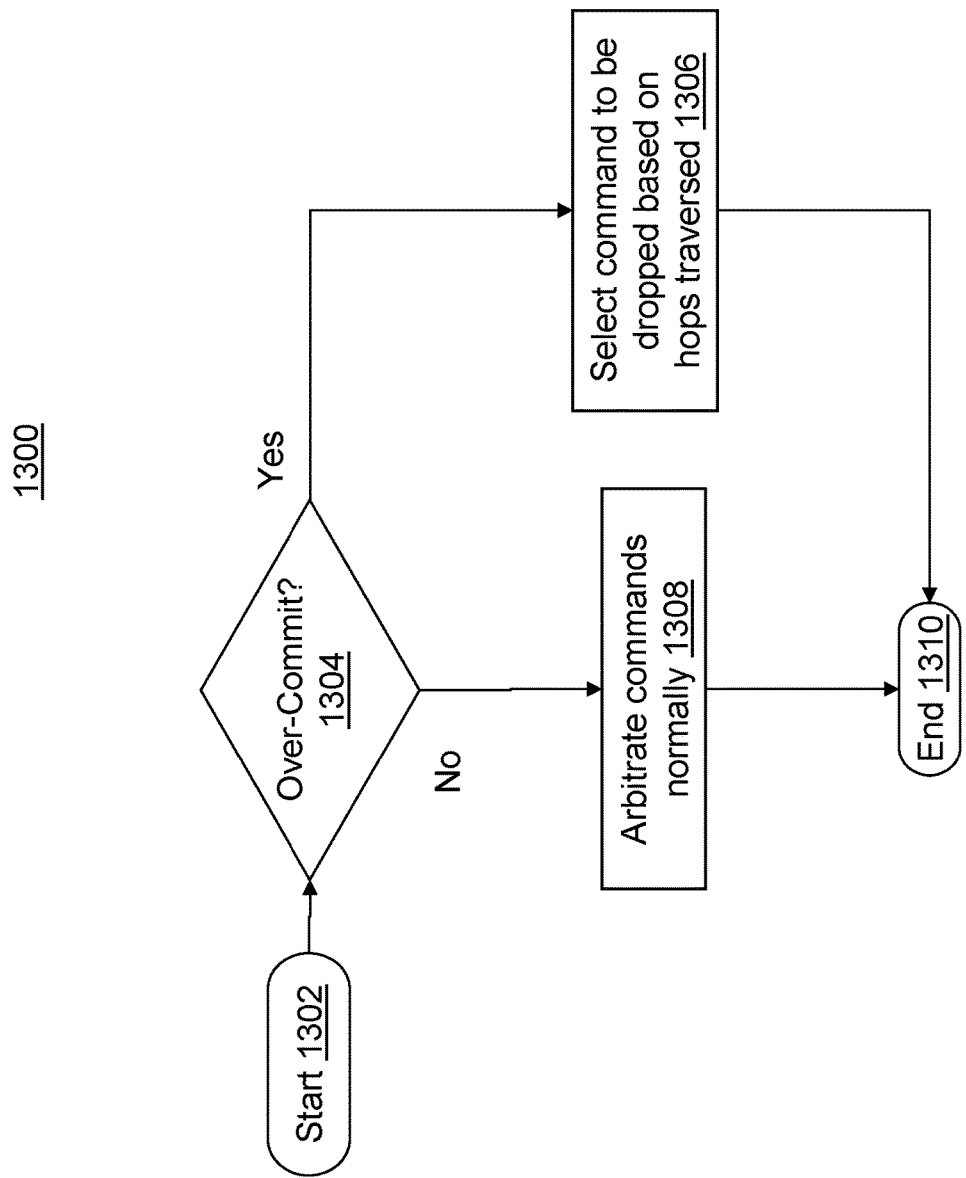
FIG. 13 is a flowchart that depicts exemplary operations performed by an arbiter when deciding which commands to drop in response to an over-commit.

With reference now to FIG. 13, there is illustrated a high level logical flowchart of an exemplary process 1300 implemented by arbiter 1032 of each processing unit 100. In block 1302 process 1300 is initiated, e.g., in response to a new command being received. Next, in block 1304, arbiter 1032 determines whether an over-commit has occurred. In response to an over-commit not occurring in block 1304 control transfers to block 1308, where arbiter 1032 arbitrates commands normally as discussed above. From block 1308 control transfers to block 1310 where process 1300 terminates. In response to an over-commit occurring in block 1304 control transfers to block 1306, where arbiter 1032 selects a broadcast command to be dropped based on a number of hops traversed through data processing system 200 by the broadcast command.

In various embodiments, multi-hop broadcast commands are weighted such that arbiter 1032 is less likely to drop the multi-hop broadcast commands after multiple hops have completed. Arbiter 1032 may be configured to determine the number of hops based on information (e.g., included in a tag) in the broadcast command. The information may include a source of the broadcast command from which arbiter 1032 is configured to determine the number of hops currently traversed by the broadcast command (e.g., by reference to a map that provides the number of hops between processing units 100 in data processing system 200). Alternatively, the information may include an indicator of the number of hops traversed through data processing system 200 by the broadcast command. In one or more embodiments, a tag included in the broadcast command specifies a chip identifier (ID) that identifies a chip that is a source of the broadcast command and a group (node) ID that identifies a group for the source chip. In at least one embodiment, arbiter 1032 is configured to achieve fairness by considering a total number of processing units 100 with current broadcast commands that are being arbitrated by arbiter 1032. Following block 1306 control transfers to block 1310.

While the invention has been particularly shown as described with reference to a preferred embodiment, it will be understood by those skilled in the art that various changes in form and detail may be made therein without departing from the spirit and scope of the invention. For example, although the present invention discloses embodiments in which FIFO queues are utilized to order operation-related tags and partial responses, those skilled in the art will appreciated that other ordered data structures may be employed to maintain an order between the various tags and partial responses of operations. In addition, although embodiments of the present disclosure employ uni-directional communication links, those skilled in the art will understand by reference to the foregoing that bi-directional communication links could alternatively be employed. Moreover, although embodiments have been described with reference to specific exemplary interconnect fabric topologies, the present invention is not limited to those specifically described herein and is instead broadly applicable to a number of different interconnect fabric topologies.

In the flow charts, the methods depicted in the figures may be embodied in a computer-readable medium as one or more design files. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method, or computer program product. Accordingly, aspects of the present invention may take the form of an entirely hardware embodiment or an embodiment combining software and hardware aspects that may all generally be referred to herein as a "circuit," "module" or "system."

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of operating a data processing system, comprising:
   determining, by an arbiter of a processing unit of the data processing system, whether an over-commit has occurred;
   in response to determining that the over-commit has occurred, selecting, by the arbiter, a broadcast command to be dropped based on a number of hops traversed through the data processing system by the broadcast command, wherein a weighting factor of a multi-hop broadcast command is increased as the number of hops traversed by the multi-hop broadcast command increases such that the arbiter is less likely to drop the multi-hop broadcast command as the number of hops traversed by the multi-hop broadcast command increases, and wherein the broadcast command includes a tag that specifies a chip identifier (ID) that identifies a chip that is a source of the broadcast command and a group ID that identifies a group for the source chip that the arbiter utilizes to determine the number of hops traversed by the multi-hop broadcast command; and
   dynamically adjusting the weighting factor of the multi-hop broadcast command when a group of one or more chips is added to or deleted from the data processing system.

2. The method of claim 1, wherein the arbiter is configured to achieve fairness by considering a total number of processing units with current broadcast commands that are being arbitrated by the arbiter.

3. A data processing system, comprising:
   a memory; and
   a processing unit coupled to the memory, wherein the processing unit includes an arbiter that is configured to:
   determine whether an over-commit has occurred;
   in response to determining that the over-commit has occurred, select a broadcast command to be dropped based on a number of hops traversed through the data processing system by the broadcast command, wherein a weighting factor of a multi-hop broadcast command is increased as the number of hops traversed by the multi-hop broadcast command increases such that the arbiter is less likely to drop the multi-hop broadcast command as the number of hops traversed by the multi-hop broadcast command increases, and wherein the broadcast command includes a tag that specifies a chip identifier (ID) that identifies a chip that is a source of the broadcast command and a group ID that identifies a group for the source chip that the arbiter utilizes to determine the number of hops traversed by the multi-hop broadcast command; and
   dynamically adjust the weighting factor of the multi-hop broadcast command when a group of one or more chips is added to or deleted from the data processing system.

4. The data processing system of claim 3, wherein the arbiter is configured to achieve fairness by considering a total number of processing units with current broadcast commands that are being arbitrated by the arbiter.

5. A data processing system, comprising:
   a first processing node including one or more first processing units; and
   a second processing node coupled to the first processing node, wherein the second processing node includes one or more second processing units each having an arbiter that is configured to:
   determine whether an over-commit has occurred;
   in response to determining that the over-commit has occurred, select a broadcast command to be dropped based on a number of hops traversed through the data processing system by the broadcast command, wherein a weighting factor of a multi-hop broadcast command is increased as the number of hops traversed by the multi-hop broadcast command increases such that the arbiter is less likely to drop the multi-hop broadcast command as the number of hops traversed by the multi-hop broadcast command increases, and wherein the broadcast command includes a tag that specifies a chip identifier (ID) that identifies a chip that is a source of the broadcast command and a group ID that identifies a group for the source chip that the arbiter utilizes to determine the number of hops traversed by the multi-hop broadcast command; and
   dynamically adjust the weighting factor of the multi-hop broadcast command when a group of one or more chips is added to or deleted from the data processing system.

6. The data processing system of claim 5, wherein the arbiter is configured to achieve fairness by considering a total number of processing units with current broadcast commands that are being arbitrated by the arbiter.

* * * * *